United States Patent
Loof et al.

(10) Patent No.: US 9,797,440 B2
(45) Date of Patent: Oct. 24, 2017

(54) BEARING

(71) Applicants: Marcus Loof, Nol (SE); Peter James, Mölndal (SE); Lars Stigsjöö, Angered (SE)

(72) Inventors: Marcus Loof, Nol (SE); Peter James, Mölndal (SE); Lars Stigsjöö, Angered (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/090,997

(22) Filed: Apr. 5, 2016

(65) Prior Publication Data

US 2016/0298683 A1 Oct. 13, 2016

(30) Foreign Application Priority Data

Apr. 9, 2015 (SE) ...................... 1550420

(51) Int. Cl.
| | |
|---|---|
| *F16C 33/36* | (2006.01) |
| *F16C 33/49* | (2006.01) |
| *F16C 33/48* | (2006.01) |
| *F16C 33/38* | (2006.01) |
| *F16C 23/08* | (2006.01) |

(Continued)

(52) U.S. Cl.
CPC .......... *F16C 23/086* (2013.01); *F16C 19/305* (2013.01); *F16C 33/467* (2013.01); *F16C 33/48* (2013.01); *F16C 33/495* (2013.01); *F16C 33/583* (2013.01); *F16C 19/38* (2013.01); *F16C 33/4682* (2013.01)

(58) Field of Classification Search
CPC ...... F16C 19/28; F16C 19/305; F16C 23/086; F16C 33/467; F16C 33/49; F16C 33/4682; F16C 33/485; F16C 33/583; F16F 33/485
USPC ....... 384/515, 558, 560, 564–565, 570, 572, 384/586, 568
See application file for complete search history.

(56) References Cited

U.S. PATENT DOCUMENTS 2,430,397 A * 11/1947 Hendricks ............. F16C 23/086
384/577
2,611,670 A * 9/1952 Palmgren ............. F16C 23/086
29/898.07

(Continued)

FOREIGN PATENT DOCUMENTS

EP 1816362 A1 8/2007
JP 2007024112 A * 2/2007 ............. F16C 19/38

(Continued)

*Primary Examiner* — Marcus Charles
(74) *Attorney, Agent, or Firm* — Bryan Peckjian; SKF USA Inc. Patent Dept.

(57) ABSTRACT

The present disclosure regards a spherical roller bearing having, an outer ring providing at least one inner raceway, an inner ring providing a first and a second outer raceway, a plurality of roller elements arranged in a first and second roller row disposed between the at least one inner raceway and the respective first and second outer raceway, the roller elements further providing axially inner ends. Moreover, the bearing includes a cage for one of guiding and retaining the roller elements in the first and second roller row, the cage including a plurality of cage pockets, wherein one of the roller elements is disposed within each cage pocket, and wherein the cage is roller centered by the axially inner ends.

7 Claims, 2 Drawing Sheets

(51) Int. Cl.
  *F16C 19/30* (2006.01)
  *F16C 33/58* (2006.01)
  *F16C 33/46* (2006.01)
  *F16C 19/38* (2006.01)

(56) References Cited

U.S. PATENT DOCUMENTS

| | | | | |
|---|---|---|---|---|
| 4,671,682 A * | 6/1987 | Yoshihara | ............... | F16C 19/26 384/480 |
| 4,714,358 A * | 12/1987 | Bayer | ................... | F16C 19/385 384/470 |
| 4,916,750 A * | 4/1990 | Scott | ..................... | F16C 23/086 384/484 |
| 5,145,267 A * | 9/1992 | Takata | .................. | F16C 23/086 384/558 |
| 5,503,030 A * | 4/1996 | Bankestrom | .......... | F16C 19/522 73/862.49 |
| 6,116,785 A * | 9/2000 | Kondo | .................. | B21B 31/076 384/463 |
| 6,814,494 B2 * | 11/2004 | Borowski | ............ | F16C 23/086 384/484 |
| 8,007,184 B2 * | 8/2011 | Murai | .................... | F16C 19/38 384/450 |
| 2007/0127858 A1 * | 6/2007 | Nakagawa | ........... | F16C 19/505 384/495 |
| 2007/0292065 A1 * | 12/2007 | Falk | ...................... | F16C 23/086 384/477 |
| 2007/0297706 A1 * | 12/2007 | Mori | .................... | F16C 23/086 384/558 |
| 2009/0190874 A1 * | 7/2009 | Burner | ................. | F16C 19/386 384/480 |
| 2014/0050431 A1 * | 2/2014 | Brameshuber | ............ | D21F 7/02 384/495 |
| 2015/0252847 A1 * | 9/2015 | Linden | .................... | F16C 23/086 384/551 |

FOREIGN PATENT DOCUMENTS

| | | | | |
|---|---|---|---|---|
| JP | 2010190241 A | * | 9/2010 | ........... F16C 33/7806 |
| JP | 2012017770 A | * | 1/2012 | ........... F16C 23/086 |

* cited by examiner

BEARING

CROSS-REFERENCE TO RELATED APPLICATIONS

This application claims priority to Swedish patent application no. 1550420-2 filed on Apr. 9, 2015, the contents of which are fully incorporated herein by reference.

TECHNICAL FIELD

The present disclosure regards a spherical roller bearing.

BACKGROUND OF THE INVENTION

Spherical roller bearings are well known for its ability to accommodate radial and axial loads, but also for its misalignment ability. These bearings are used in many different applications, especially in more demanding applications where there are larger loads and also where there may be shaft deflections. One example of where a spherical roller bearing can be advantageously used is in wind turbine applications. Other examples of areas where these bearings can be a suitable alternative is in pulp and paper machines, marine applications, off-highway applications and in mining applications.

There are several different designs available. For instance, there are spherical roller bearings comprising comb-shaped cages, but also bearings comprising window type cages. In addition, some of the known designs include guide rings and other bearing types include mid-flanges on the inner rings. The different designs present different advantages and are thus useful and adapted to different needs. The bearings may for instance be optimized for different circumstances and environments, such as for high or low speed applications, mainly for radial loads, mainly for axial loads, large shaft deflections etc.

SUMMARY OF THE INVENTION

In view of the above, an object of the present invention is to provide a new spherical roller bearing design which alleviates at least some of the drawbacks of the prior art. Moreover, an object of the present invention is to provide a spherical roller bearing design which is especially advantageous for use in applications when a loaded zone of the bearing is located in a radial top region of the bearing in relation to the direction of the force of gravity, and/or for relatively low speed applications.

The objects have been achieved by the features as presented in the independent claim. Advantageous embodiments of the invention can be found in the dependent claims and in the accompanying description and drawings.

The objects have been achieved by a spherical roller bearing, comprising, an outer ring presenting at least one inner raceway, an inner ring presenting a first and a second outer raceway, a plurality of roller elements arranged in a first and second roller row in-between the at least one inner raceway and the respective first and second outer raceway, the roller elements further presenting axially inner ends. Moreover, the bearing comprises a cage for guiding and/or retaining the roller elements in the first and second roller row, the cage presenting a plurality of cage pockets, in which each cage pocket one of the roller elements is meant to be located, wherein the cage is roller centered by the axially inner ends.

The inventors have realized that it may be advantageous in many situations to center the cage on the roller elements instead of centering the cage on either the inner or outer ring of the bearing. In addition, in some situations it may also be advantageous to center the cage on the inner axial ends of the roller elements. This may be specifically advantageous in situations when there is a loaded zone in a radial top region of the bearing in relation to the gravity force, which will lead to that the cage will be centered by the roller elements in the loaded zone of the bearing. In addition, the design is especially advantageous for essentially horizontal bearing arrangements. The roller elements in the loaded zone will behave in a stable manner and may not fluctuate or skew, which will lead to a more stable centering of the cage by the roller elements. There may also be other situations when it may be advantageous to center the cage on the axial inner ends of the roller elements, for instance in applications with relatively low rotating speeds. In addition, the bearing is especially advantageous for applications which are arranged in an essentially horizontal extent.

In an embodiment, the bearing further presents a specific pitch circle diameter (PCD), and wherein each cage pocket further presents a cage pocket bottom which faces the axially inner end of the roller element in the respective cage pocket, and wherein the cage pocket bottom is arranged to be able to contact the axially inner end of the roller element, either:
  radially outwardly from the pitch circle diameter (PCD),
  essentially in the pitch circle diameter (PCD), or
  radially inwardly from the pitch circle diameter (PCD).

A bearing's pitch circle diameter (PCD) is something which is well known by the skilled person. The pitch circle diameter can be defined as the diameter that intersects the rotational axle of the roller elements in the bearing in an axial location of the bearing. In addition, the phrases axial and radial are frequently used in this document. If nothing else is stated, an axial direction is defined as the axial direction of the bearing which is parallel to its rotational axis, the axial direction of the inner ring which is parallel to its rotational axis, the axial direction of the outer ring which is parallel to its rotational axis and the axial direction of the cage which is parallel to its rotational axis. Radial direction is the direction which is perpendicular to the corresponding axial directions.

In an embodiment, the cage pocket bottom is further arranged to be able to contact the roller element in a radial top region of the bearing which is located essentially opposite to the direction of the force of gravity.

In an embodiment, two essentially axially opposite cage pockets bottoms for the first and second respective roller rows are relatively inclined and essentially following the contact angles of the respective first and second roller rows. With this design, the two axially opposite cage pocket bottoms will assume a wedge-like shape between its roller elements in the respective first and second roller rows. This will lead to a firm and stable contact between the rollers and the cage.

In an embodiment of the present invention, the bearing does not present any spacer ring (such as a guide ring) or mid-flange axially in-between the first and second roller rows. It is well known to make use of a guide ring axially in-between the two roller rows of the bearing. The guide ring is especially useful when the bearing is used in more high-speed applications. In addition, the cage is often centered on the guide ring, which in turn is in contact with the inner ring. By removing the guide ring from the bearing, there will be fewer components. This is of course advantageous in terms of cost, but also it may lead to a more robust bearing design due to the fact that there will be fewer components in the bearing. Moreover, a mid-flange, which is frequently used in prior art designs, is also costly to have since the manufacturing of an inner ring comprising a mid-flange will be more complicated. Also, the presence of a mid-flange will result in more material, leading to a higher weight and also a higher material cost. In addition, the design of the present invention will lead to that there will be a free space between the cage and the inner ring in-between the first and second roller row. This space can be used for lubricant, such as grease or oil. This may lead to that the lubrication of the contact between the raceways of the inner ring and the roller elements is improved since the lubricant can be stored in the proximity of these contact zones.

In another embodiment, a spacer ring or guide ring for guiding the roller elements is present axially in-between the first and the second roller row. A spacer ring may be needed in applications where there are higher rotating speeds. For instance, the spacer ring may guide the roller elements in the first and second roller row.

In an embodiment of the present invention, a spherical roller bearing is presented, wherein at least one of the plurality of cage pockets is radially outwardly enclosing the roller contained therein such that the roller element will be restricted to move radially outwardly out from the at least one cage pocket. By having such a design the roller elements can be prevented from falling out from the bearing, for instance during assembly of the bearing. In another embodiment, the inner ring further presents a first and second axially outer region on opposite axial sides of the bearing, wherein the respective first and second axially outer region presents a first and second respective side flange. The side flange can further improve and prevent rollers from falling out from the bearing.

In an embodiment of the present invention, the cage is a comb-shaped cage (also known as a pronge type cage). In an embodiment, the cage is made of a polymer, a metal such as brass, steel or iron, or any other suitable material recognized by the skilled person.

Other embodiments and modifications to the current embodiments presented herein within the scope of the claims would be apparent to the skilled person. For example, the skilled person will understand and realize that the cage pocket bottom geometry can be designed differently to still achieve the same effect, i.e. that the cage will be roller centered on the rollers' axially inner roller ends.

BRIEF DESCRIPTION OF THE DRAWINGS

Exemplifying embodiments of the present invention will now be described in more detail, with reference to the accompanying drawings, wherein.

Figure 3:
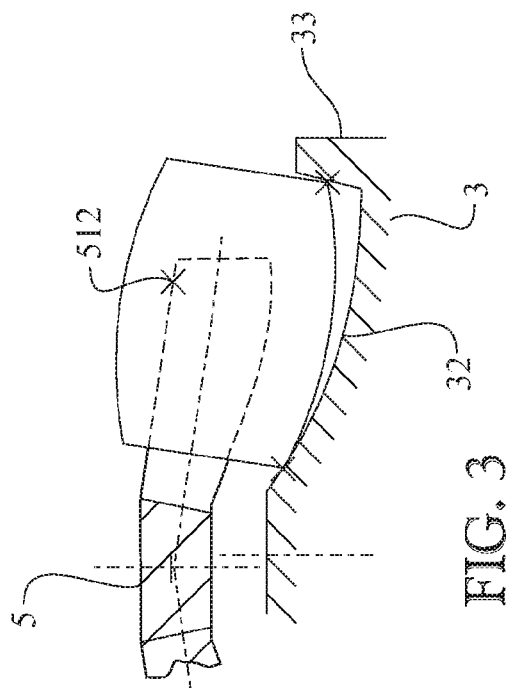
FIG. 3 shows another cross sectional view of a bearing according to the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF THE INVENTION

Figure 1:
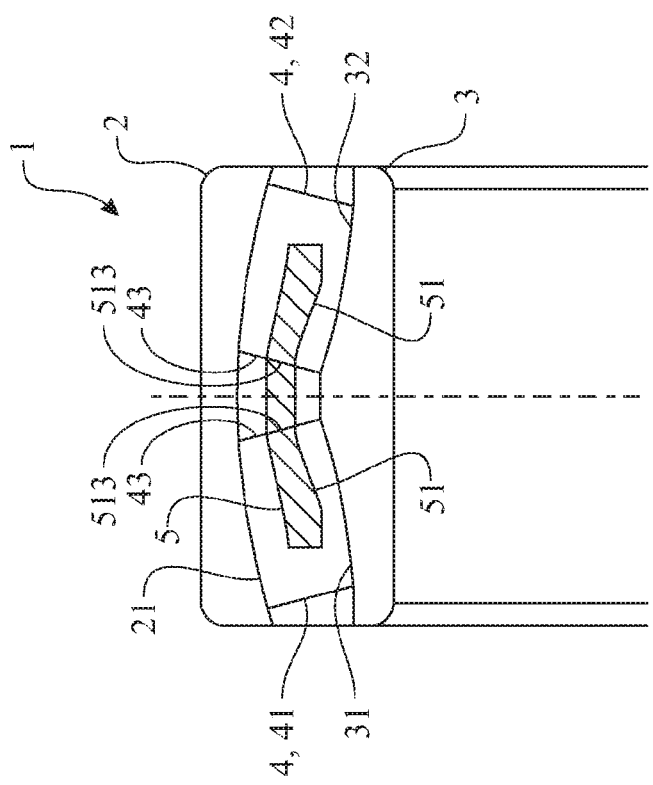
FIG. 1 shows a cross sectional view of a bearing according to an embodiment of the present invention.

FIG. 1 shows a cross sectional view of a bearing 1 according to an embodiment of the present invention. The bearing 1 comprises an outer ring 2 with one inner spherical raceway 21, an inner ring 3 presenting a first and a second outer raceway 31 and 32, a plurality of roller elements 4 arranged in a first and second roller row, 41 and 42, in-between the at least one inner raceway 21 and the respective first and second outer raceways 31 and 32. Moreover, the bearing 1 comprises a cage 5 for retaining and/or guiding the roller elements 4 in the first and second roller rows 41 and 42, the cage 5 presents a plurality of cage pockets 51, in which each cage pocket 51 one of the roller elements 4 is meant to be located. The cage 5 is roller centered on the inner axial ends 43 of the roller elements 4. Further, it can be seen that the cage pockets 51 present cage pocket bottoms 513 which are located on an axial inner side of the cage pockets 51 and which are facing the inner axial ends 43 of the roller elements 4 in the respective first and second roller rows 41 and 42. The cage 5 will contact the axial ends 43 of the roller elements 4 at the cage pocket bottoms 513. In addition, in this embodiment, the cage pocket bottoms 513 are inclined and essentially in line with the contact angles of the first and second roller rows 41 and 42. Due to this, the two oppositely located cage pocket bottoms 513 will be shaped as a wedge. This will lead to that the cage 5 will "fall down" on the axial side faces of the roller elements 4 due to the gravity force. In addition, in this embodiment, there is no spacer ring or mid-flange in the bearing 1.

Figures 2A, 2B, 2C:
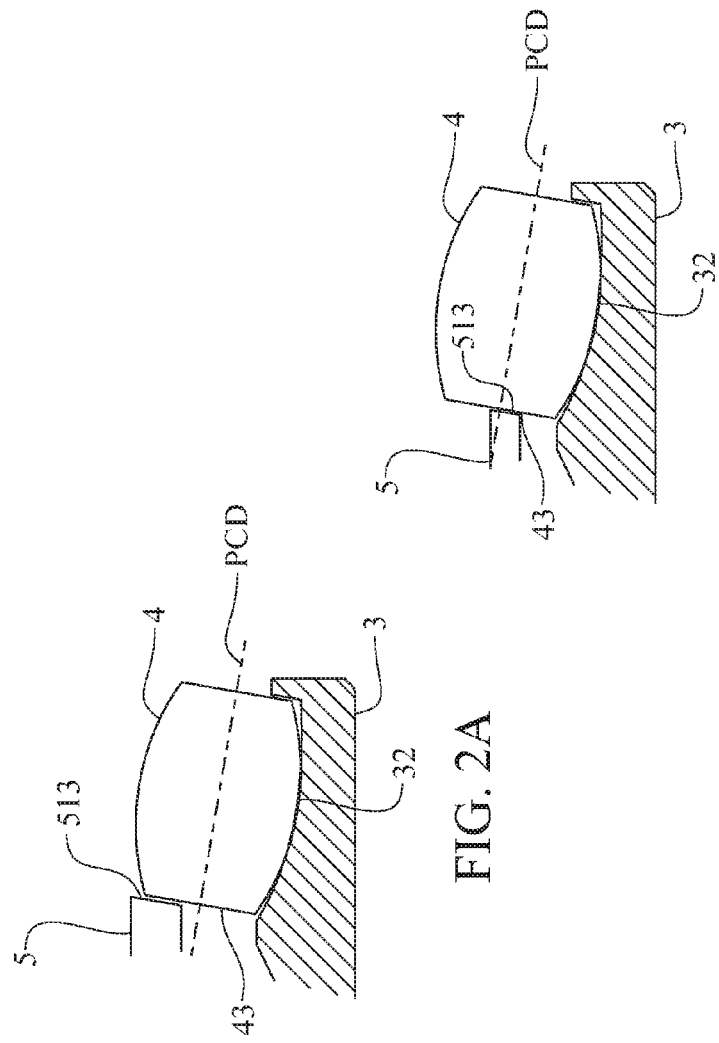
FIGS. 2A, 2B, and 2C show cross sectional views of one axial side of a bearing according to the present invention.

FIGS. 2A, 2B, and 2C show other embodiments of the present invention. Here, three examples of how the roller end centering can be accomplished are shown. Starting from the top, showing a cross sectional view of an inner ring 3, a roller element 4 and a portion of a cage 5, it can be seen the roller end 43 contacts the cage pocket bottom 513 radially outwardly from the pitch circle diameter PCD. In the illustration in the middle, it can be seen that the roller end 43 contacts the cage pocket bottom 513 under or even close to the pitch circle diameter PCD. In the illustration in the bottom, another example of an over-pitch roller end centering is seen. The angle of the cage pocket bottom 513 can also be different as seen in the three illustrations. The centering on the roller element ends 43 will advantageously occur when the loaded zone is located in the radial top region of the bearing 1 in relation to the direction of the gravity force.

FIG. 3 shows a portion of a cross sectional view of a bearing 1 according to an embodiment of the present invention. In this view, a portion of an inner ring 3 can be seen, a cage 5, a roller 4 and a side flange 33 of the inner ring 3. Further, here it can be seen that the cage pocket 51 is outwardly enclosing the roller such that the roller 4 will not be able to move radially outwardly out from the cage pocket 51. This has been done by having a curved profile in the cage pocket 51 such that the roller 4 will eventually contact a contact portion 512 of the cage pocket 51. In addition, the side flange 33 will prevent the roller 4 from axially falling out from the bearing 1. This will lead to that the rollers 4 will be self-contained in the bearing 1. Thus, there is no need for having for example a window-type cage. The rollers 4 will still not be able to fall out from the bearing at any time. This is advantageous, especially for safety reasons.

The invention claimed is:

1. A spherical roller bearing having a specific pitch circle diameter (PCD), the spherical roller bearing comprising:
    an outer ring providing at least one inner raceway,
    an inner ring providing a first and a second outer raceway,
    a plurality of roller elements arranged in a first and second roller row disposed between the at least one inner raceway and the respective first and second outer raceway, each roller element comprising an axially inner end, and
    a cage for one of guiding and retaining the roller elements in the first and second roller row, the cage having a plurality of cage pockets, wherein one of the roller elements is disposed within each cage pocket, and wherein
    each respective cage pocket further provides a cage pocket bottom that faces the axially inner end of the roller element in the respective cage pocket, wherein the cage pocket bottom is configured to be located entirely radially outward from the specific pitch circle diameter (PCD) such that a radially inner end of the cage pocket bottom contacts the axially inner end of the roller element at a location radially outward from the specific pitch circle diameter (PCD),
    the cage is held in position by the axially inner ends.

2. The spherical roller bearing according to claim 1, wherein two axially opposite cage pockets bottoms for the first and second respective roller rows are inclined and follow the contact angles of the respective first and second roller rows.

3. The spherical roller bearing according to claim 1, wherein no spacer ring is axially disposed between the first and second roller rows.

4. The spherical roller bearing according to claim 1, wherein at least one of the plurality of cage pockets is radially outwardly enclosing the roller element contained therein such that the roller element will be restricted to move radially outwardly out from the at least one cage pocket.

5. The spherical roller bearing according to claim 1, wherein the inner ring further comprises a first and second axially outer region on opposite axial sides of the bearing, and wherein the respective first and second axially outer region includes a first and second respective side flange.

6. The spherical roller bearing according to claim 1, wherein the cage is a comb-shaped cage.

7. The spherical roller bearing according to claim 1, wherein no mid-flange is axially disposed between the first and second roller rows.

* * * * *